United States Patent [19]

Crivello et al.

[11] Patent Number: 4,609,705

[45] Date of Patent: Sep. 2, 1986

[54] POLYIMIDE MOLDING COMPOSITIONS

[75] Inventors: James V. Crivello, Clifton Park; Steven T. Rice, Schenectady, both of N.Y.

[73] Assignee: General Electric Company, Schenectady, N.Y.

[21] Appl. No.: 703,771

[22] Filed: Feb. 21, 1985

Related U.S. Application Data

[63] Continuation-in-part of Ser. No. 514,728, Jul. 18, 1983, abandoned.

[51] Int. Cl.[4] ................... C08F 216/12; C08F 216/14
[52] U.S. Cl. ..................................... 524/779; 524/548; 524/786; 524/788; 524/789; 524/850; 526/218.1; 526/230; 526/232; 526/232.1; 526/262
[58] Field of Search ............... 526/262, 334, 218, 230, 526/232.1; 524/548, 779, 786, 788, 789

[56] References Cited

U.S. PATENT DOCUMENTS

| | | | |
|---|---|---|---|
| 3,558,741 | 1/1971 | Holub et al. | 260/827 |
| 3,576,031 | 4/1971 | Holub et al. | 260/448.2 |
| 3,652,716 | 3/1972 | Holub et al. | 260/860 |
| 3,689,464 | 7/1972 | Holub et al. | 260/78 UA |
| 3,729,446 | 4/1973 | Holub et al. | 260/47 CZ |
| 3,763,273 | 10/1973 | Holub et al. | 260/857 UN |
| 3,787,439 | 1/1974 | Holub et al. | 260/326 E |
| 4,277,582 | 7/1981 | Mueller et al. | 526/334 |
| 4,288,583 | 9/1981 | Zahir et al. | 526/262 |
| 4,294,743 | 10/1981 | Graham | 260/32.8 EP |
| 4,294,877 | 10/1981 | Graham | 428/209 |
| 4,298,720 | 11/1981 | Yamazaki et al. | 526/262 |
| 4,323,662 | 4/1982 | Oba et al. | 526/262 |
| 4,383,025 | 5/1983 | Green et al. | 430/280 |
| 4,388,450 | 6/1983 | Crivello | 525/502 |
| 4,388,451 | 6/1983 | Culbertson et al. | 526/262 |

OTHER PUBLICATIONS

Leonard, ed., Vinyl and Diene Monomers, vol. 24, part I, 1970, pp. 399–401.
Ser. No. 459,442.

Primary Examiner—Harry Wong, Jr.
Attorney, Agent, or Firm—Richard J. Traverso; James C. Davis, Jr.; James Magee, Jr.

[57] ABSTRACT

A molding composition is provided comprising aromatic vinyl ether and maleimide. The cured composition exhibits high heat distortion temperatures and is easily processed into finished products with or without a catalyst.

15 Claims, No Drawings

POLYIMIDE MOLDING COMPOSITIONS

This application is a continuation-in-part application of Ser. No. 514,728, filed July 18, 1983, now abandoned.

CROSS REFERENCE TO RELATED APPLICATIONS

This invention is related to copending application Ser. No. 459,442 filed Jan. 20, 1983 now U.S. Pat. No. 4,518,788 assigned to the same assignee as the present invention.

BACKGROUND OF THE INVENTION

Bismaleimides have been utilized with epoxy monomers and aromatic amines to provide polyimide molding compositions with high heat distortion temperatures, as disclosed in U.S. Pat. Nos. 4,294,723 and 4,294,877. A disadvantage that is characteristic of these molding compositions is that they have a slow cure rate, typically requiring about 0.5-2 hours to cure.

Maleic anhydride has been known to react rapidly with aliphatic vinyl ethers, as disclosed by Leonard, ed. *Vinyl and Diene Monomers.* Vol. 24, Part I, NY: Wiley interscience, 1970, pp. 399-401. However, the cured product obtained with maleimide and aliphatic vinyl ethers are not attractive because of low heat distortion temperatures. In addition, these aliphatic vinyl ethers are liquid at room temperature and are not amenable to the formulation of solid molding compositions, making such compositions difficult to process into finished products.

The present invention is based on the discovery that maleimides copolymerize rapidly with aromatic vinyl ethers. The resulting copolymers have high oxidative stability and high heat distortion temperatures which overcome the disadvantages characteristic of polyimide molding compositions known to the art.

STATEMENT OF THE INVENTION

The invention provides a molding composition comprising an aromatic vinyl ether and maleimide. The preferred molding compositions comprise:

(A) aromatic vinyl ether of the formula

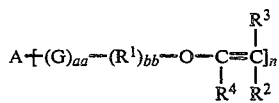   (I)

(b) maleimide having at least one chemically combined unit of the formula

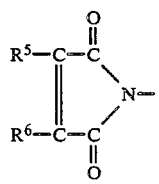   (II)

wherein $R^2$, $R^3$, $R^4$, $R^5$ and $R^6$ are selected from the group consisting of hydrogen, halogen and alkyl radicals of from 1 to 8 carbon atoms, $R^1$ is an alkylene radical of from 1 to 8 carbon atoms, G is selected from the group consisting of —O—,

and mixtures thereof, A is selected from a group of monovalent and polyvalent aromatic radicals having from 6 to 130 carbon atoms, n is an integer equal to 1-10 inclusive and both aa and bb are integers having a value of 0 or 1, subject to the proviso that where bb is zero, aa is zero.

Examples of maleimides suitable for use in the molding compositions comprising this invention are described by Holub et al. in the following U.S. Pat. Nos. 3,558,741 and 3,787,439 (maleimide substituted organo polysiloxane); 3,652,716 and 3,729,446 (maleimide substituted polyesters); 3,689,464 and 3,763,273 (maleimide substituted polyamides) and 3,576,031 (maleimide substituted organosilanes). All of the above-identified patents are assigned to the same assignee as the present invention and are incorporated herein by reference.

Other suitable maleimides include bismaleimides of the formula:

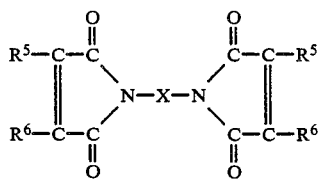

and monofunctional maleimides of the formula:

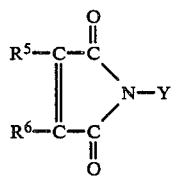

wherein $R^5$ and $R^6$ are selected from the group consisting of hydrogen, halogen and alkyl radicals of from 1 to 8 carbon atoms; X is selected from a group consisting of divalent hydrocarbon radicals of from 1-35 carbon atoms and divalent groups of the formula

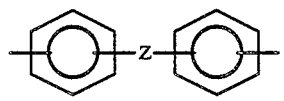

where Z is selected from the class of divalent radicals consisting of hydrocarbon radicals of from 0 to 15 carbon atoms, —S—, —O—, —SO₂—,

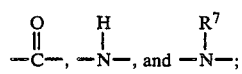

where $R^7$ is a monovalent alkyl radical of from 1–6 carbon atoms; and Y is a monovalent hydrocarbon radical selected from the group consisting of aliphatic radicals of from 1–8 carbon atoms and aromatic radicals of from 6–20 carbon atoms;

Some bismaleimides may be prepared by effecting reaction between a diamino compound of the formula $NH_2-X-NH_2$ and maleic anhydride to form the maleamic acid, where X has the meaning given above. The maleamic acid is treated with acetic anhydride and a catalyst composition, such as a mixture of nickel acetate and triethyl amine, to produce the corresponding bismaleimide.

Some monofunctional maleimides can be made in a similar fashion by utilizing an amine of the following formula $NH_2-Y$ and maleic anhydride to form the maleamic acid, where Y is a group of monovalent radicals defined above.

Some of the higher molecular weight maleimides can be produced by the methods described in the patents identified above, which are incorporated herein by reference.

In addition to bismaleimides and monofunctional maleimides, maleimide oligomers of the following formula are suitable for use in the molding compositions of this invention,

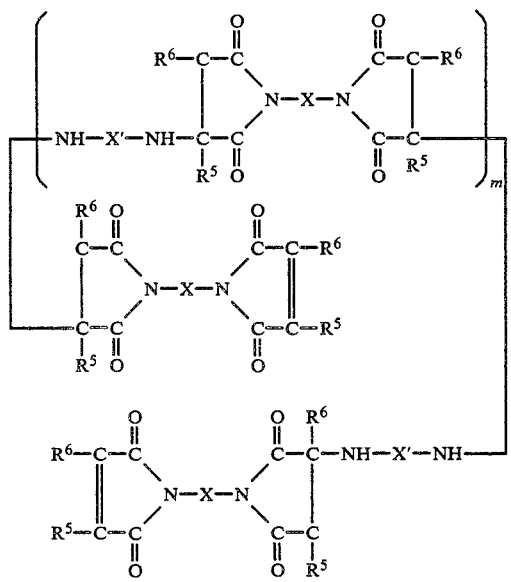

wherein X, $R^6$ and $R^5$ are as previously defined and $X'$ is selected from the same group of divalent organic radicals from which X is selected, and m is an integer of from 1 to 10 inclusive.

These oligomers may be prepared by effecting a condensation reaction between bismaleimide and diamine of the formula $NH_2-X'-NH_2$, where $X'$ is selected from a group of divalent radicals as defined above. A stoichiometric deficient quantity of diamine is utilized to prevent complete polymerization of the bismaleimides.

The maleimide monomers and oligomers can be varied widely, as can the organic radicals represented by X, X' and Y which are present therein. Among the divalent groups which X and X' may more specifically represent are, for example, divalent saturated alkylene radicals of up to 15 carbon atoms having linear, branched and cyclic structures including, methylene, ethylene, propylene, butylene, isopropylidene, hexylene, cyclohexylene, neopentylene, etc. The members of the divalent groups, X and X', also include divalent radicals of the formula $-CH_2-CH_2-O-CH_2-CH_2-$. Divalent aromatic radicals within the scope of X and X' include, for example, m-phenylene, p-phenylene, 2,6-naphthylene, 2-methyl-1,3-phenylene, dichlorophenylene and diaryl groups such as p,p'-biphenylene, m,m'-biphenylene, diphenylene methylene, diphenylene oxide, diphenylene sulfone, diphenylene sulfide, ketobiphenylene, etc. These diaryl radicals may be attached to the nitrogens through ortho, meta or para positions.

Typical examples of bismaleimides which can be utilized in the molding compositions of this invention or be converted to oligomers include, for example,
N,N'-1,2-ethylene-bismaleimide,
N,N'-methylene bismaleimide,
N,N'-1,4-butylene-bismaleimide,
N,N'-1,6-hexamethylene-bismaldimide,
N,N'-1,4'-phenylene-bismaleimide,
N,N'-1,3'-phenylene-bismaleimide,
N,N'-2-methyl-1,3-phenylene-bismaleimide,
N,N'-4,4'-diphenylmethyl bismaleimide,
N,N'-4,4'-diphenylether bismaleimide,
N,N'-4,4'-diphenylsulfone bismaleimide,
N,N'-4,4'-diphenyl sulfide-bismaleimide,
N,N'-4,4'-dicyclohexylmethane-bismaleimide,
N,N'-1,3-xylene-bismaleimide,
N,N'-4,4'-benzophenone-bismaleimide,
N,N'-(3,3'-dichloro-4,4'-biphenylene)bismaleimide, The above list of bismaleimides are typically prepared by reacting 1 mole of a diamino compound having the corresponding divalent radical X with 2 moles of maleic anhydride. Other anhydrides, such as substituted maleic anhydrides, may be utilized for making the bismaleimides. For example, citraconic anhydride and pryocinchonic anhydride can be utilized to produce bismaleimides, such as N,N'-4,4'diphenyl methane-bis(-methyl-maleimide) and N,N'-4,4'-diphenyl methane-bis(dimethylmaleimide) with 4,4'-diamino diphenyl methane. Mixtures of anhydrides and or mixtures of diamino compounds may be employed for making mixtures of bismaleimides. Such mixtures of bismaleimide are suitable for use in the molding composition comprising this invention and for producing oligomers suitable for subsequent use in this invention. Halogenated bismaleimides, where halogen is on the divalent radical X and X' or the monovalent radicals $R^5$ and $R^6$, can be employed without departing from the scope of this invention. For example, N,N'-(3,3'-dichloro-4,4'-diphenyloxy-bismaleimide), N,N'-(3,3'-dibromo-4,4-diphenylmethane)-bismaleimide, etc. are suitable maleimides for use in the molding compositions comprising this invention.

Monofunctional maleimides can also be varied widely depending on the organic radicals which are present therein. Among the monovalent radicals which Y may more specifically represent are, for example, monovalent saturated alkyl radicals of up to 8 carbon atoms having linear and branched structures. The suitable alkyl radicals include, for example, methyl, ethyl, propyl, butyl, isopropyl, pentyl, hexyl, etc. The monovalent radicals represented by Y also include aromatic radicals of from 6–20 carbon atoms. Included in this group, are, for example, phenyl, 3-methyl phenyl, naphthyl, biphenyl, etc.

The aromatic vinyl ethers of the molding compositions comprising this invention can be varied widely due to the many different aromatic units which can be present therein. A portion of the vinyl ether monomers suitable for the molding composition of this invention are more particularly defined by Crivello in U.S. Pat. No. 4,388,450 and copending application Ser. No. 459,442, referred to above. Some of the aromatic polyvinyl ether monomers within the scope of this invention are more particularly defined below. The aromatic vinyl ethers which are suitable for use in this invention also include aromatic vinyl ethers having only one vinyl ether moiety.

Radicals included within the scope of A of formula I are, for example, polyvalent aromatic radicals such as phenylene, tolylene, xylylene, naphthylene, xenyl, anthrylene, and diaryl groups of the formula

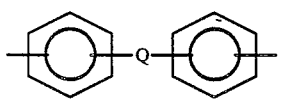

where Q is selected from —O—, —S—,

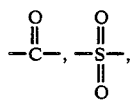

alkylene radicals of from 1–8 carbon atoms and a divalent aromatic group of the formula

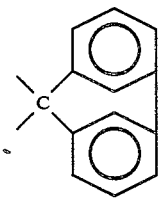

Polyvalent aromatic radicals also included within the scope of A include those of the formula

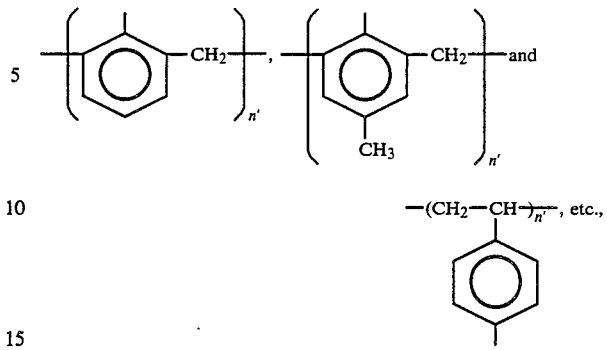

where $n'$ is an integer of from 1 to 10 inclusive.

Monovalent aromatic radicals within the scope of A include phenyl, naphthyl, xylyl and diaryl groups of the formula

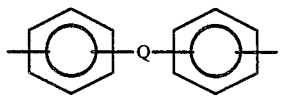

where Q is as previously defined.

Suitable aromatic vinyl ethers also vary with the radicals which are present on the vinyl ether group

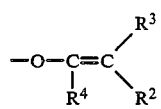

which can be bonded directly to the aromatic group A, or be separated by a divalent alkylene radical, $R^1$, with or without the functional group G. The functional group G can be either —O— or

The divalent radicals included within the scope of $R^1$ of formula I are alkylene radicals of 1–8 carbon atoms, such as methylene, ethylene, trimethylene, tetramethylene, etc. Radicals within the scope of $R^3$, $R^2$ and $R^4$ are, for example, hydrogen, monovalent alkyl radicals of 1–8 carbon atoms, such as methyl, ethyl, propyl, etc. and halogen radicals such as, chloro, bromo, etc.

Halogenated derivatives of the aromatic radicals, i.e. where one or more of the hydrogens on the aromatic radicals are replaced by halogen atoms, are also within the scope of A. For example, chlorophenylene, bromotolylene, chlorophenyl, bromophenyl, and the like. Specific examples of aromatic polyvinyl ethers of formula I include compounds such as,

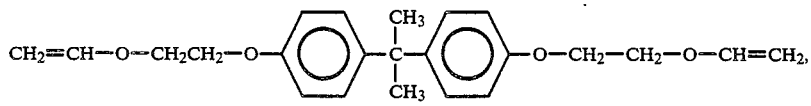

-continued
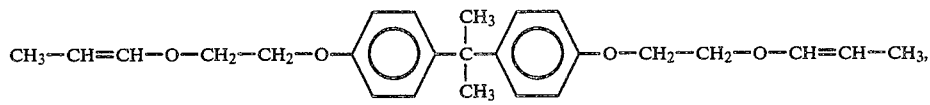
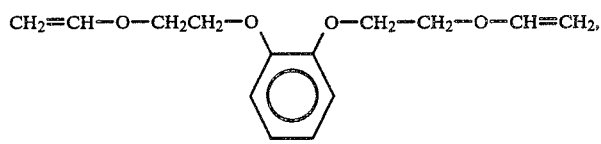
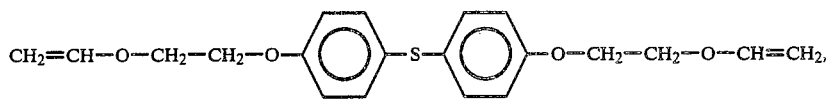
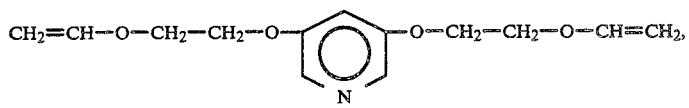
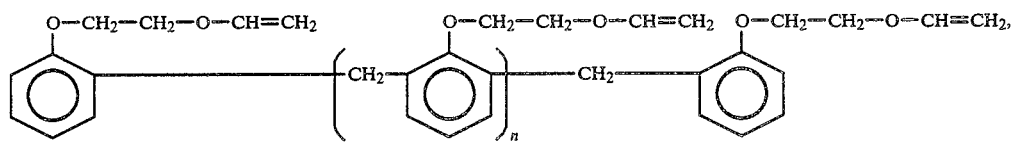
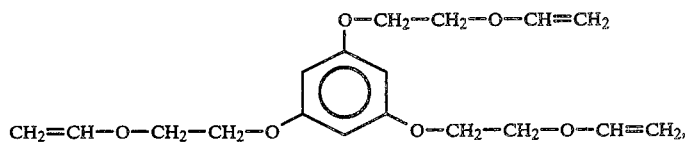
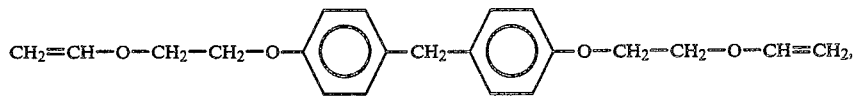
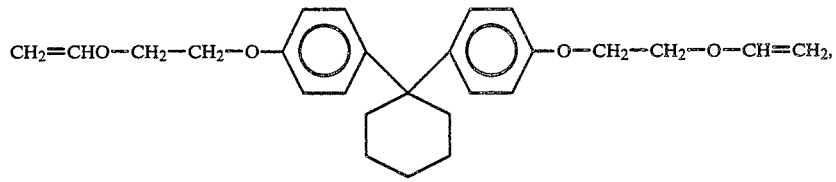
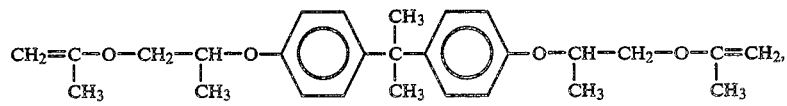
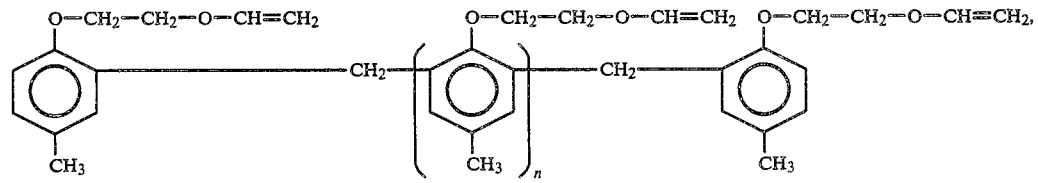

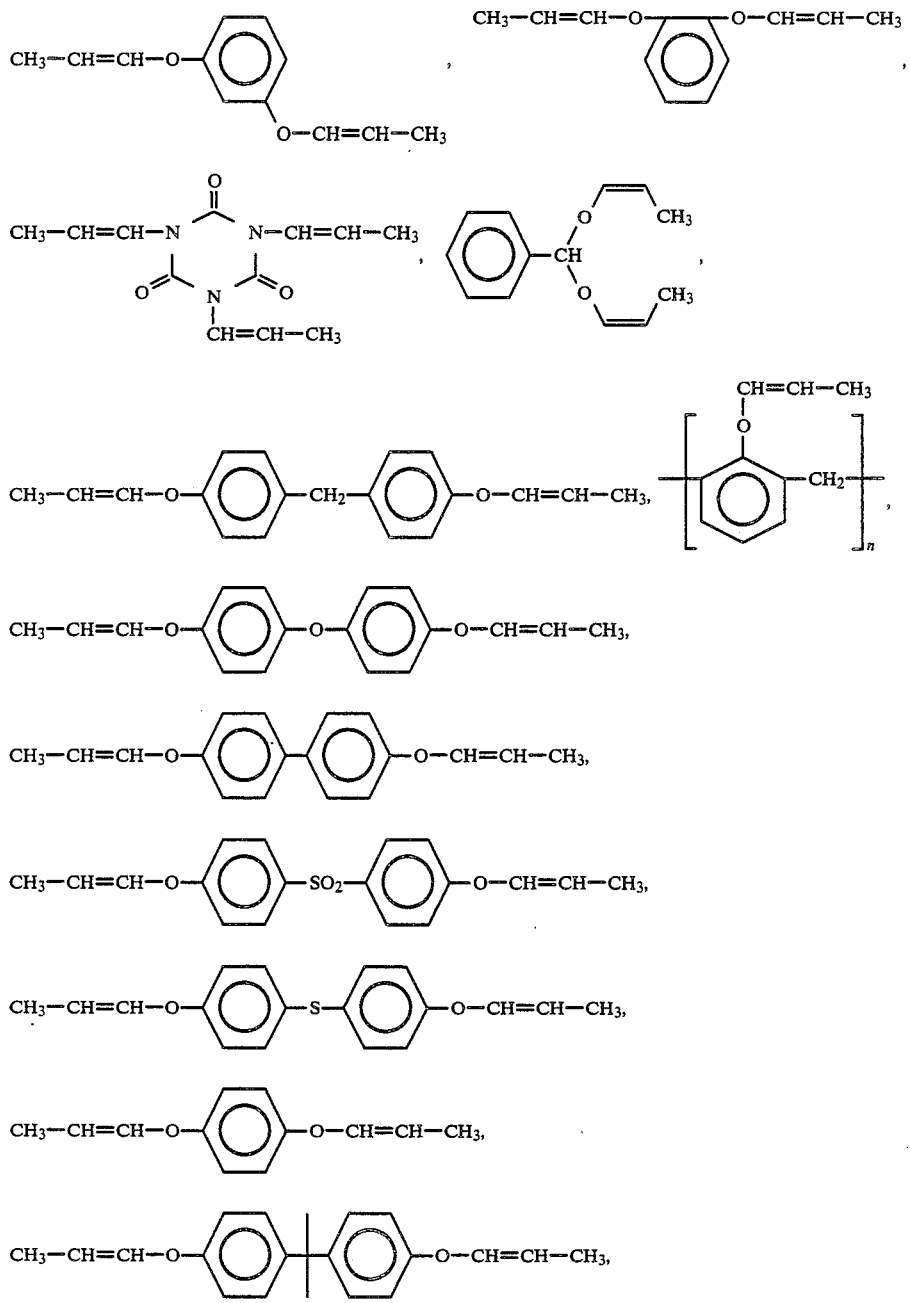

and the like, wherein n is an integer of from 1 to 10 inclusive.

One method of making some of the aromatic vinyl ethers of formula I is to condense an alkali metal salt of an aryl hydroxide or carboxylic acid with a halo-alkyl vinyl ether in the presence of dimethylsulfoxide as shown by the following equation:

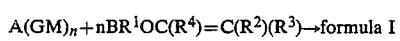

where A, G, $R^1$, $R^2$, $R^3$ and $R^4$ and n are as previously defined, B is a halogen radical and M is an alkali metal ion.

An example of a method for preparing the molding composition is to melt mix aromatic vinyl ether and maleimide compounds below about 110° C. Other methods for mixing these two compounds, such as dry blending, will be obvious to those skilled in the art. In certain embodiments, such as coprecipitation of the components, they need not be mixed. In addition to the maleimide compounds and the aromatic vinyl ethers, the molding composition may contain a peroxide or azo-catalyst to reduce the curing temperature or curing time necessary. Typical organic peroxides suitable for catalysis are, for example, ketone peroxides, peroxy acids, dibasic acid peroxides, aldehyde peroxides, alkyl peroxides, hydro peroxides, alkyl peroxyesters, diperoxide derivatives, for example, t-butyl peroxy pivalate, 2,4-dichlorobenzoyl peroxide, caprylyl peroxide, lauroyl peroxide, decanoyl peroxide, propionyl peroxide, acetyl peroxide, t-butyl peroxyisobutyrate, p-chlorobenzoyl peroxide, benzoyl peroxide, hydroxyheptyl peroxide, cyclohexanone peroxide, 2,5-dimethylhexyl-2,5-di(-peroxybenzoate), di-t-butyl diperphthalate, t-butylhydroperoxide, di-t-butylperoxide, methyl ethyl ketone peroxide, p-methane hydroperoxide, cumene hydroperoxide, 2,5-dimethyl hexyl-2,5-dihydroperoxide, 5-butylhydroperoxide, peracetic acid, perbenzoic acid, m-chloro perbenzoic acid, etc.

In addition to these organic peroxides, some azo-compounds are suitable for catalysis in the molding composition of this invention. Such azo-compounds include azo-bis-alkyl nitriles and azo-compounds of the formulas:

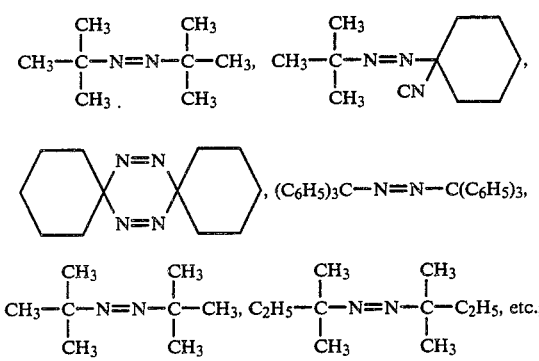

and quinones, such as

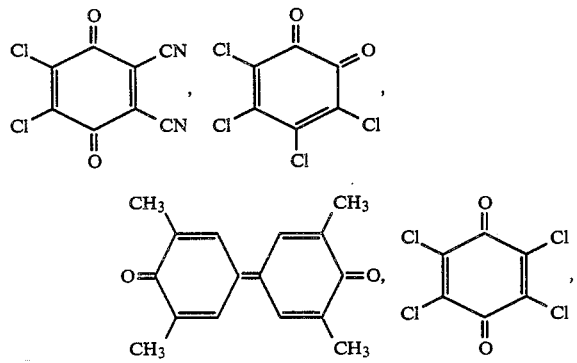

etc.

Besides a catalyst, the molding composition may also contain fillers, such as clay, silica, calcium carbonate, aluminum trihydrate, carbon black, talc, calcium sulfate, wollastonite, etc. Suitable weight ratios of filler to active ingredients fall within the range of 0 to 300 parts filler per 100 parts active ingredients. These molding compositions may also contain other additives such as antioxidants, flame retardants, impact modifiers, etc.

Once the molding composition is prepared by melt mixing the aromatic vinyl ethers and maleimide compounds together with the desired additives, the molding composition is cured by raising the temperature from 140° to about 170° C. Rapid polymerization results from the application of such temperatures. This heat activated polymerization is usually accomplished within a mold under pressure. Such pressures can range from about 200 psi to about 600 psi. Cure times typically fall within the range of about 1-4.5 minutes. Although this polymerization is rapid at relatively low temperatures in absence of a catalyst, the cure temperature or the cure time can be reduced upon addition of a peroxide or azo-catalyst indicated above. The cure time for such molding compositions containing catalysts are typically reduced to within the range of about 1 minute to about 2 minutes. This enables the polyimide molding compositions of this invention to be used as photocurable coatings and to be employed as photoresists. A photo-initiated cure can be achieved with conventional free radical photo-initiators; such as butyl benzoin ether, added to the mixture of aromatic vinyl ether monomers and maleimide monomers. A photo-initiated cure can be achieved for mixtures containing the above-identified butyl benzoin ether where a molding composition is radiated for 30 seconds at a distance of 6 inches from a mercury arc lamp. When intending to cure by photoinitiation, it is preferable to use maleimide monomers having low melting points to aid solubility with the aromatic vinyl ethers at room temperature.

An alternative to mixing the maleimide compounds and aromatic vinyl ether monomers, as identified above, is to dissolve both the aromatic vinyl ether monomers and the maleimide compounds in a common organic solvent; such as acetone, and impregnate a fiber matrix; such as fiber glass cloth, with the solution. The organic solvent is then evaporated off the fiber matrix producing a dry fiber matrix impregnated with the maleimide compounds and the vinyl ether monomers, herein referred to as "prepreg". These prepregs are cut, stacked and heated to initiate polymerization. Suitable cure temperatures fall within the range of about 140° C. to about 170° C. These prepregs can be molded when pressed together under such curing temperatures for about 2-3 minutes and pressures of about 400-600 psi.

An alternative to curing a melt mixture comprised substantially of maleimide and the aromatic vinyl ether is to granulate and pelletize the mixture to make solid thermosetting compositions for injection, compression and transfer molding.

Optimum cross linking densities are typically obtained from a molding composition having a 1:1 mole ratio of maleimide having more than 1 electron deficient group, such as bismaleimides, to aromatic vinyl ether having more than one vinyl group, such as aromatic bis vinyl ether. However, the stoichiometry of the molding composition is variable within wide tolerances and a suitable cured composition may be achieved with molding compositions where the ratio of maleimide functional groups of formula II to vinyl groups can have a value in the range of about 0.25 to about 4. The mole ratio of the maleimide to aromatic vinyl ether can vary over a wider range, with cured compositions being obtained from mole ratios of the two components as high as 100.

The mechanical properties of the cured molding composition can be altered to desired values by varying the stoichiometry of the molding composition and by altering the constituents of the molding composition.

For example, where improved flexural strength and elongation is desired, maleimide oligomers may be preferred over the maleimide monomers. Variations of the stoichiometry can provide changes in the flexural strength, elongation and tensile strength also.

Cure temperatures are preferably within the range of about 140° to about 170° C. Higher temperatures are suitable, however, such higher temperatures may cause unnecessary degradation of the aromatic vinyl ethers or additives present within the molding compounds. Cure times at these temperatures vary within the range of 1 minute to 4½ minutes depending on the presence of catalysts and the quantity of such catalysts.

The cured molding compositions typically exhibit

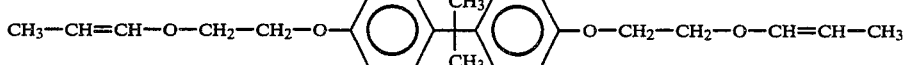

high heat distortion temperatures of approximately 220° C. and suitable engineering properties such as percent elongation, tensile strength, tensile modulus, flexural strength, etc.

The following experimental procedures were used to produce selected constituents of particular thermoplastic compositions comprising this invention. These procedures are provided to aid in the practice of this invention and are not intended to limit this invention.

To produce N,N'-4,4'-diphenylmethane bismaleimide, 4,4'-diaminodiphenylmethane and 0.5 mole maleic anhydride were added to 1 liter of acetone. Rapid reaction occurred to form a bismaleamic acid precipitate. Then 0.5 mole triethylamine, 0.02 mole nickel acetate and 2.5 moles of acetic anhydride were added. After refluxing the mixture for 2.5 hours, all of the bismaleamic acid had dissolved and the reaction mixture was poured into an equal volume of water. The product, which separated as an oil, was allowed to crystallize in an ice bath and was purified by two recrystallizations from toluene. The yield prior to recrystallization was 65–80% theory.

To produce the divinyl ether of the following formula

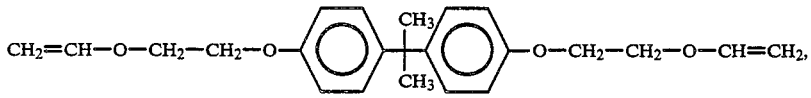

bisphenol-A (68.5 g), toluene (500 ml) and 24 g NaOH dissolved in 100 ml water were added to 1000 ml flask. The flask was equipped with a paddle stirrer, reflux condenser, Dean Stark trap, and a nitrogen inlet. The reaction mixture was heated to reflux and the water which was formed was collected in the trap and removed from the reaction. Reflux was continued until no more water was being collected, then the trap was replaced with a special Dean Stark trap containing activated molecular sieves. Reflux was continued overnight to fully dry the system. The reaction mixture was then filtered and the bisphenol-A-disodium salt collected. The above salt was transferred to a 2000 ml flask and one liter dimethyl sulfoxide was added. This reaction mixture was heated to approximately 60° C. and 65 g 2-chloroethyl vinyl ether was added slowly. The reaction mixture was then stirred at 60° C. for 1 hour, cooled and stirred at room temperature for an additional 5 hours, then poured into 1000 ml 50% NaOH. An oil separated and was removed. The oil was washed three additional times with 50% aqueous NaOH to remove unreacted bisphenol-A. The wash solutions were extracted with ether and the extractions added to the oil. On evaporation of the ether, a 77 g yield of the divinyl ether was obtained (69.8% yield).

To produce the aromatic divinyl ether of the formula:

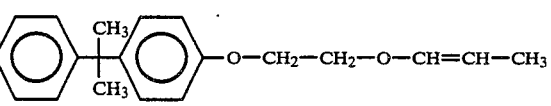

A reaction mixture of 632.76 g (2 moles) bisethoxylated bisphenol-A (Dianol-22, AKZO Chemie), 300 ml toluene, and 459.2 g (6 moles) allylchloride was stirred until the bisethoxylated bisphenol-A had dissolved. Then 240 g (6 moles) solid NaOH was added and stirring continued for 0.5 hour. Next, 32 g (0.1 mole) tetrabutylammonium bromide was added and the stirring continued for 0.5 hour. The temperature of the reaction mixture was slowly raised to 50°, then the reaction temperature rose to 100° C. as exothermic reaction took place. The reaction mixture temperature was brought to 75° C. with a water bath and stirred overnight (16 hours). The product was isolated by pouring the reaction mixture into 2 liters of distilled water and isolating the organic layer by means of a separatory funnel. After washing the organic layer with three 500 ml portions of water, it was dried over solid sodium sulfate and the toluene removed under vacuum to yield 690 g (86% theory) of bisallyl ether product.

To the bisallyl ether of ethoxylated bisphenol-A, 396.5 g (1 mole) were added 0.96 g ($1 \times 10^{-3}$ mole) $RuCl_2(PPh_3)_3$. The reaction mixture was brought slowly to 120° C. with a silicone oil bath and maintained at this temperature for 1.5 hour. After cooling, the product was examined by nuclear magnetic resonance and found to have isomerized completely to the bispropenyl ether. The product was a mixture of three isomeric bispropenyl ethers (cis-cis, cis-trans, trans-trans).

The examples below are provided to illustrate embodiments of this invention and are not intended to limit this invention. All parts are by weight unless otherwise specified.

EXAMPLE I

The following example demonstrates the preparation and method of curing an embodiment of this invention.

The following materials were heated and mixed together at 80° C. until homogeneous.

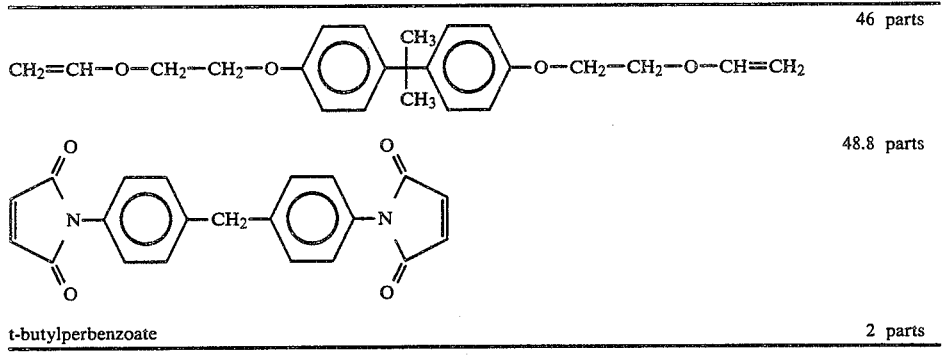

46 parts 48.8 parts t-butylperbenzoate 2 parts

The mixture was allowed to cool and harden. Then it was . pulverized and dry blended with 100 parts silica (Combustion Engineering, CEM 421). This mixture was further mixed on a 2-roll mill at 80° C. and allowed to harden. The solid molding compound was transfer molded in a 12 ton Hull transfer molding press at 600 psi and 160° C. for 2 minutes. Test bars were obtained having a heat distortion temperature at 264 psi of greater than 200° C. The mechanical properties are illustrated in Table I.

TABLE I

| Temp (°C.) | Flexural Strength | Flexural Modulus | Tensile Strength | Tensile Modulus |
|---|---|---|---|---|
| 25 | 8.843 | 2.02 × 10$^6$ | 2.554 | 7.04 × 10$^5$ |
| 150 | | | 2.027 | |
| 180 | | | 2.077 | 7.5 × 10$^5$ |

EXAMPLE II

This example demonstrates a method of preparing and curing an embodiment of this invention.

Into a large beaker there were placed

The mixture was heated and stirred at 80° C. until homogeneous, then 120 parts silica (CEM 421) were added and mixing continued until a homogeneous blend was obtained. A molding compound with a dough-like consistency was obtained which was transfer molded as described in the previous example. Bars and discs were obtained having a heat distortion temperature of 180° C.

EXAMPLE III

This example demonstrates another method of curing an embodiment of this invention.

Example I was repeated omitting the silica filler. After the mixture was made homogeneous by stirring at 80° C., it was used to impregnate glass cloth. The impregnated cloth was then cut into 6"×6" squares and 7 of the squares stacked together to make a prepreg. After pressing the prepreg in a Carver press for 2 minutes at 160° C. and 500 psi, a cured laminate resulted.

EXAMPLE IV

This example demonstrates a method for preparing and curing an embodiment of this invention.

Using the procedure of Example I, the following components were mixed at 80° C.

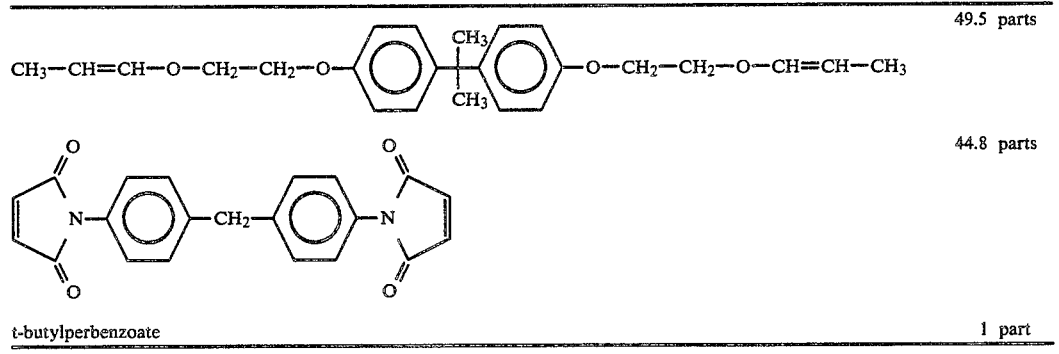

49.5 parts 44.8 parts t-butylperbenzoate 1 part

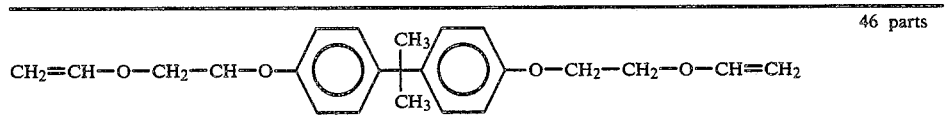

46 parts

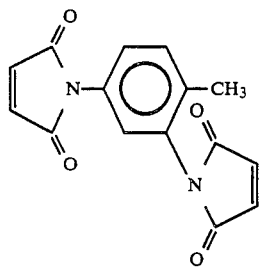

35.3 parts t-butylperbenzoate 1 part

Subsequently, the mixture was powder blended with 120 parts silica (CEM 42I) and then mill rolled at 80° C. The hardened molding compound was then transfer molded as described in Example 4 to give molded parts with a heat distortion temperature of greater than 200° C.

EXAMPLE V

This example demonstrates the effect different radical initiators have on the resin gel time.

Equimolar amounts of the following materials were heated and mixed together at 150° C. using 2% by weight of various radical initiators;

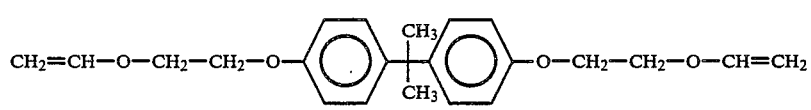

(0.1 moles)

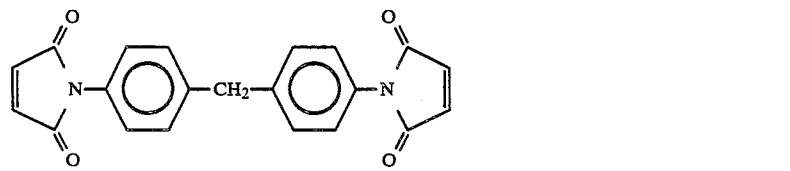

(0.1 moles)

The gel times for five different mixtures utilizing the radical initiators listed in Table II were measured with a Sunshine Gel meter equipped with a constant temperature bath maintained at 150° C. The gel time measurements and half-life of the initiators are indicated in Table II.

TABLE II

| EXPERI-MENT | RADICAL INITIATOR | INITIATOR HALF-LIFE (hr at temp) | GEL TIME (min) |
|---|---|---|---|
| A | azoisobutronitrile | 0.40 (100° C.) | 1.0 |
| B | benzoyl peroxide | 0.40 (100° C.) | 2.9 |
| C | benzopinacole | — | 4.5 |
| D | t-butyl hydroperoxide | 520 (130° C.) | 4.3 |
| E | t-butyl perbenzoate | 18 (100° C.) | 3.0 |

EXAMPLE VI

This example demonstrates a method of photo-curing an embodiment of this invention.

To 3.58 g (0.01 mole) N,N'-bismaleimide-4,4'-diphenyl methane and 3.10 g (0.01 mole) bisphenol A-bis-propenyl ether there was added 0.13 g (3% by weight) N-butylbenzoin ether (benzoin n-butyl ether). The mixture was warmed slightly to produce a homogeneous solution and then spread as a 2 mil film onto a glass plate using a drawbar. The film was irradicated for 30 seconds at a distance of 6 inches from a medium pressure mercury arc lamp to produce a cross-linked insoluble film. When a mask was placed over the film prior to irradiation, a negative image of the mask was obtained on washing the film with acetone after irradiation.

EXAMPLE VII

The example demonstrates methods for preparing and curing embodiments of this invention.

To 0.01 mol of each of the aromatic vinyl ethers shown in Table III were added and blended 0.01 g t-butylperbenzoate and 0.01 mole (3.58 g) of N,N'-4,4'-diphenylmethane bismaleimide having the formula

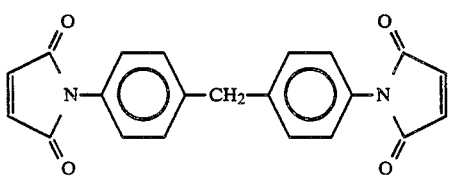

to form a dry paste. Each of the samples were placed in a Sunshine Gel timer and the gel times measured at 130° C. The gel times for each sample appear in Table III.

TABLE III

Gel times for various Aromatic Vinyl Ethers

| Sample No. | Aromatic Vinyl Ether | Gel Time (min.) |
|---|---|---|
| 1 | 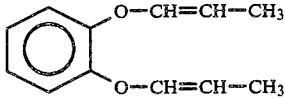 | 1.7 |
| 2 |  | 1.1 |
| 3 | 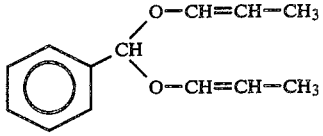 | 1.9 |
| 4 | 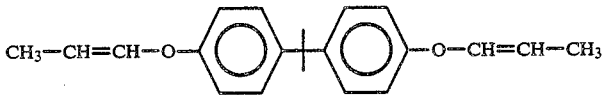 | 3.0 |

Although the above examples have shown various modifications of the present invention, it should be understood that further modifications by one skilled in the art are possible in light of the above teachings without departing from the spirit and scope of this invention.

What is claimed is:

1. A molding composition comprising:
   (A) aromatic vinyl ether of the formula

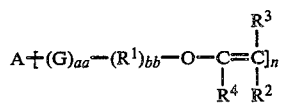

and
   (B) maleimide having at least one chemically combined unit of the formula

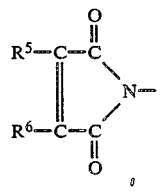

wherein $R^1$ is an alkylene radical of from 1 to 8 carbon atoms, $R^2$, $R^3$, $R^4$, $R^5$ and $R^6$ are selected from the group consisting of hydrogen, halogen and alkyl radicals of from 1 to 8 carbon atoms, G is selected from the group consisting of —O—,

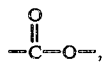

and mixtures thereof, A is selected from a group consisting of monovalent and polyvalent aromatic radicals of from 6 to 130 carbon atoms, n is an integer equal to 1-10 inclusive and both aa and bb are integers having a value of 0 or 1, subject to the proviso that when bb is zero, aa is zero.

2. A molding composition of claim 1 additionally comprising an effective amount of thermal-curing catalyst.

3. A molding composition of claim 2 wherein the thermal-curing catalyst is selected from the class consisting of organic peroxide and azo-compounds.

4. A molding composition in accordance with claim 3 wherein the thermal-curing catalyst is selected from a group of organic peroxides consisting of t-butyl perbenzoate, t-butylhydro-peroxide benzopinacole, and benzoyl peroxide.

5. A molding composition of claim 1 wherein the maleimide is bismaleimide of the following formula

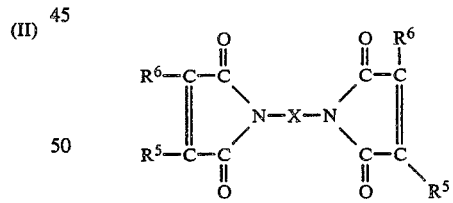

wherein $R^6$ and $R^5$ are previously defined in claim 2 and X is selected from the group consisting of divalent hydrocarbon radicals of from 1 to 35 carbon atoms and divalent groups of the formula

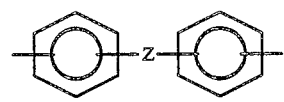

wherein Z is either a bond between the phenyl groups or selected from the class of divalent radicals consisting of hydrocarbon radicals of from 1 to 15 carbon atoms, —S—, —O—, —SO$_2$—,

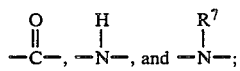

wherein R⁷ is a monovalent alkyl radical of from 1 to 6 carbon atoms.

6. A molding composition in accordance with claim 5 wherein the divalent radical, X, of the bismaleimide is bisphenol-A.

7. A molding composition of claim 1 wherein the maleimide is of the following formula

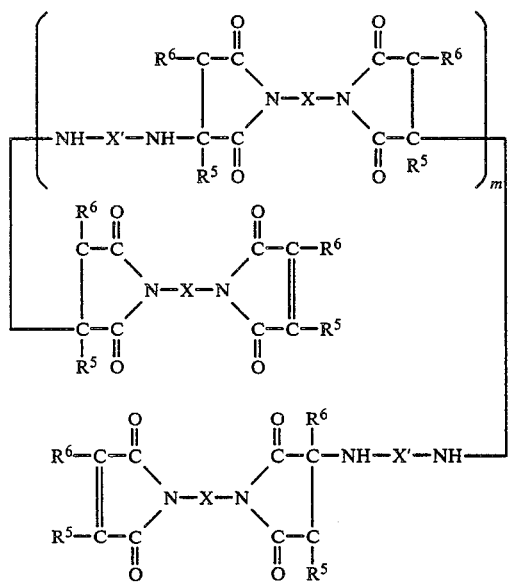

wherein R⁶ and R⁵ are as previously defined in claim 2 and both X and X' are independently selected from the group consisting of divalent hydrocarbon radicals of from 1 to 35 carbon atoms and divalent groups of the formula

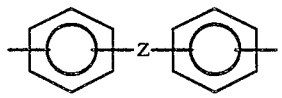

where Z is selected from the class of divalent radicals consisting of divalent hydrocarbon radicals of from 0 to 15 carbon atoms, —X—, —O—, —SO₂—,

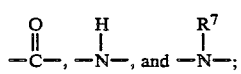

wherein R⁷ is a monovalent alkyl radical of from 1 to 6 carbon atoms and m is an integer from 1 to 10 inclusive.

8. A molding composition in accordance with claim 1 wherein the maleimide is selected from the group consisting of N,N-r,4'-diphenylmethane bismaleimide and N,N'-6-methyl-1,3-phenylene bismaleimide.

9. A molding composition in accordance with claim 1 wherein the aromatic radicals represented by A of formula I are selected from the group consisting of phenylene, tolylene, xylylene, naphthylene, xenyl, anthrylene, diaryl groups of the formula

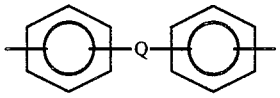

and polyvalent aromatic radicals selected from the group of formulas consisting of

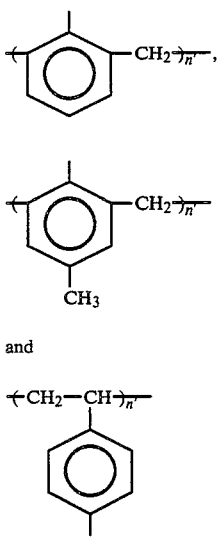

and wherein Q is selected from a class consisting of divalent radicals of the formulas —S—, —O—, —SO₂—,

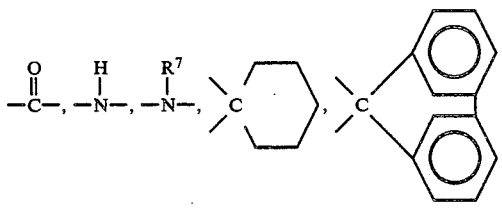

and alkylene radicals of from 1-8 carbon atoms, R⁷ is an radical of from 1 to 6 carbon atoms, and n' is an integer equal to 1 to 10 inclusive.

10. A molding composition in accordance with claim 1 wherein the aromatic radical A of formula I is bisphenol-A.

11. A molding composition in accordance with claim 1 wherein the aromatic vinyl ether is selected from a group consisting of bisvinyl ethers having the formulas

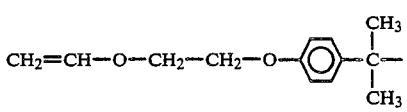

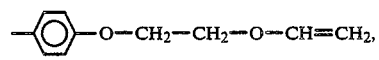

-continued

CH$_3$—CH=CH—O—CH$_2$—CH$_2$—O—⟨C$_6$H$_4$⟩—C(CH$_3$)$_2$—

—⟨C$_6$H$_4$⟩—O—CH$_2$—CH$_2$—O—CH=CH—CH$_3$,

⟨C$_6$H$_4$⟩(O—CH=CH—CH$_3$)$_2$,

CH$_3$—CH=CH—O—CH$_2$—⟨C$_6$H$_4$⟩—CH$_2$—O—CH=CH—CH$_3$,

⟨C$_6$H$_5$⟩—CH(O—CH=CH—CH$_3$)$_2$ and

CH$_3$—CH=CH—O—⟨C$_6$H$_4$⟩—⟨C$_6$H$_4$⟩—O—CH=CH—CH$_3$.

12. A molding composition in accordance with claim 1 wherein a molar ratio of maleimide to aromatic vinyl ether has a value within the range of about 0.25 to about 4.

13. A molding composition comprising:
(A) 0 to 60% of one or more fillers and
(B) 40 to 100% of a reactive composition comprising
 (a) aromatic vinyl ether of the formula $$A\text{-}[(G)_{aa}\text{---}(R^1)_{bb}\text{---}O\text{---}\underset{R^4}{\underset{|}{C}}=\underset{R^2}{\underset{|}{C}}\text{---}\underset{}{\overset{R^3}{\overset{|}{}}}]_n$$

and
(b) maleimide having at least one chemically combined of the formula $$\begin{array}{c} R^6\text{---}C(=O)\\ \| \\ R^5\text{---}C(=O) \end{array} \!\!\!\!\!\! \begin{array}{c} \\ \diagdown \\ N\text{---} \\ \diagup \end{array}$$

wherein $R^6$, $R^2$, $R^3$, $R^4$ and $R^5$ are selected from the group consisting of hydrogen, halogen and alkyl radicals of from 1 to 8 carbon atoms, $R^1$ is an alkylene radical of from 1 to 8 carbon atoms, G is selected from the group consisting of —O—, $$\underset{}{\overset{O}{\overset{\|}{-C-O-}}},$$

and mixtures thereof, A is selected from a group consisting of monovalent and polyvalent aromatic radicals of from 6 to 130 carbon atoms, n is an integer equal to 1–10 inclusive and both aa and bb are integers having a value of 1 or 0, subject to the proviso that when bb is zero, aa is zero.

14. A molding composition in accordance with claim 13 wherein said filler is selected from a group consisting of clay, silica, calcium carbonate, aluminum trihydrate, carbon black, talc, calcium sulfate and wollastonite.

15. A molding composition in accordance with claim 13 wherein said filler is in the form of a fiber matrix.

* * * * *